United States Patent [19]
Kanai et al.

[11] Patent Number: 5,769,450
[45] Date of Patent: Jun. 23, 1998

[54] STEERING WHEEL ASSEMBLY CONTAINING AN AIR BAG MODULE

[75] Inventors: Makoto Kanai, Gifu; Atsushi Nagata; Katsunobu Sakane, both of Aichi, all of Japan

[73] Assignee: Toyoda Gosei Co., Ltd., Aichi, Japan

[21] Appl. No.: 688,726

[22] Filed: Jul. 31, 1996

[30]     Foreign Application Priority Data

Jul. 31, 1995   [JP]   Japan ..................................... 7-195326

[51] Int. Cl.$^6$ ................................................. B60R 21/16
[52] U.S. Cl. ........................................ 280/731; 200/61.54
[58] Field of Search ................................ 280/731, 728.2, 280/728.1, 732; 200/61.54; 307/10.1

[56]           References Cited

U.S. PATENT DOCUMENTS

| | | | |
|---|---|---|---|
| 4,699,400 | 10/1987 | Adams et al. | 280/731 |
| 5,011,181 | 4/1991 | Laucht et al. | 280/731 |
| 5,584,501 | 12/1996 | Walters | 280/728.2 |
| 5,584,503 | 12/1996 | Lutz | 280/731 |
| 5,615,907 | 4/1997 | Stanger | 280/728.2 |
| 5,685,559 | 11/1997 | Cuevas | 289/728.2 |

FOREIGN PATENT DOCUMENTS

| | | |
|---|---|---|
| 4435451 | 4/1995 | Germany . |
| 4429214 | 2/1996 | Germany . |
| 5-82213 | 4/1993 | Japan . |
| 2282574 | 4/1995 | United Kingdom . |
| WO 90/15732 | 12/1990 | WIPO . |

*Primary Examiner*—Christopher P. Ellis
*Attorney, Agent, or Firm*—Cushman Darby & Cushman IP Group of Pillsbury Madison & Sutro, LLP

[57]              ABSTRACT

An air bag inflator actuating assembly, which is suitable for application in a steering wheel assembly, including an air bag module is provided. The air bag module includes a folded air bag and an inflator, which are disposed above a core of a boss retained in the steering wheel. A lower cover is assembled below the inflator, and a wheel pad is arranged immediately above the air bag module. The inflator is electrically connected to an external wiring connector through a brushless transmitter. A lower surface of the inflator and an upper surface of the brushless transmitter are electrically connected to each other through a pair of leadless connectors.

18 Claims, 3 Drawing Sheets

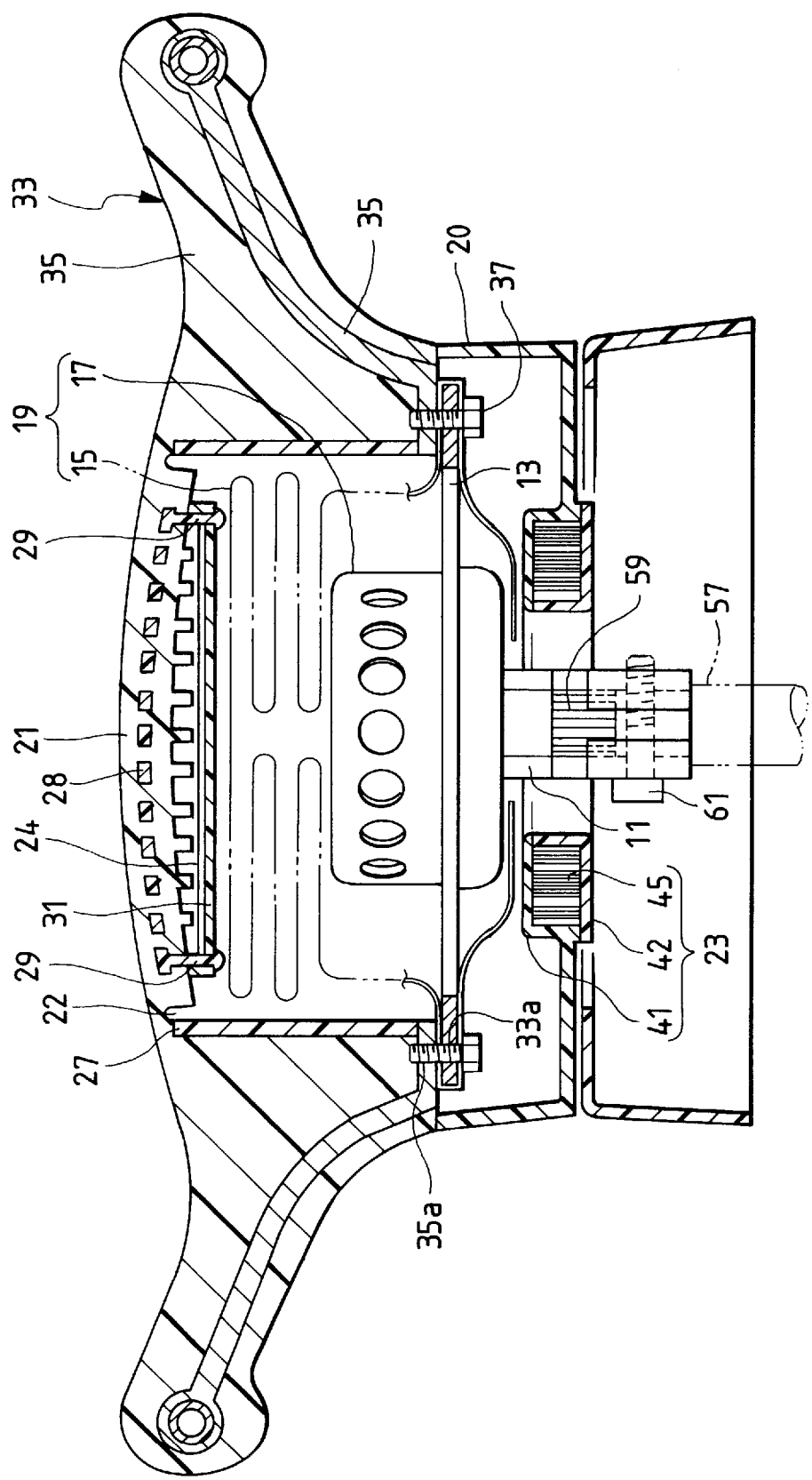

STEERING WHEEL ASSEMBLY CONTAINING AN AIR BAG MODULE

BACKGROUND OF THE INVENTION

1. Field of the Invention

The present invention relates to an air bag inflator actuating assembly which contains an air bag apparatus and which is particularly suitable for application in a steering wheel assembly of an automobile or similar vehicle. In particular, the present invention is directed to an air bag inflator actuating assembly including an inflator that is directly electrically connected to a brushless transmitter by a pair of leadless connectors.

2. Description of the Related Art

With the recent advent of regulations requiring the adaption of expandable air bag devices in automobile steering wheels, there has been an increasing demand for improvements in the reliability and dependability of such air bag devices. In a conventional steering wheel assembly, the air bag is designed to actuate upon collision of the automobile. Such a collision creates a predetermined electric signal at a predetermined time. The electrical signal is communicated to an inflator, which is suitable for introducing a gas to a folded air bag connected to the inflator so as to expand the air bag.

As disclosed in, for example, Japanese Patent Publication No. Hei. 5-82213, the electrical system for communicating this signal includes an external wiring connector, which transmits the electrical signal to the steering wheel assembly, and in particular to a brushless transmitter fixed to a lower cover of the steering wheel. Attached to the brushless connector is a second connector, which transmits the electrical signal through a lead wire until it reaches a first connector positioned on the inflator. Upon receipt of the electrical signal, the inflator is actuated and expands the air bag. Because the inflator and the brushless transmitter are not in direct contact with each other, the lead wire is required to electrically connect the first and second connectors of the inflator and brushless transmitter, respectively.

However, during operation of the vehicle, and in particular during a collision involving the vehicle, the vehicle is subjected to various vibrations and impacts. Because the inflator and brushless transmitter are not directly connected, they may be subjected to different and opposing vibrational movements. As a result, the connection between the inflator and the brushless transmitter can become compromised, thereby causing the first or second connectors to disengage from the inflator or the brushless transmitter, respectively, thereby prohibiting actuation of the air bag.

In order to avoid such disengagement, particularly during a collision, special provisions are taken to secure the connection between the first and second lead wire connectors and the inflator and brushless transmitter, respectively, so as to avoid interruption of the electrical connection. For example, Japanese Patent Publication No. Hei 5-82213 discloses the use of locking pawls to secure the electrical connection. However, such special provisions are typically accompanied by complex locking designs and/or an increase in the number of steps required to electrically connect the inflator to the brushless transmitter.

SUMMARY OF THE INVENTION

It is an object of the present invention to address the aforementioned problems associated with the related art by providing an air bag inflator actuating assembly which is suitable for application in a steering wheel assembly and which contains an air bag apparatus that needs no special provision for preventing the connectors from disengaging and thereby interrupting the electrical connection between the inflator and the brushless transmitter.

According to a first embodiment of the present invention, there is provided an air bag inflator actuating assembly contained in a steering wheel assembly that includes a boss plate connected to a boss, which is generally disposed in a middle of the steering wheel. An air bag module is connected to and arranged above the boss plate, the air bag module including an expandable air bag retained in a folded position and an inflator. The inflator has a lower surface which contains a first leadless connector. A brushless transmitter has a second leadless connector on its upper surface. According to this embodiment, one of the leadless connectors is receivable by the other leadless connector to thereby permit direct electrical connection between the inflator and brushless transmitter. Stated differently, lead wires do not have to be positioned intermediate the first and second leadless connectors, since the connectors are in direct contact with each other. In addition, this direct electrical connection also electrically connects the inflator to an external wiring connector, which sends a signal through the brushless transmitter and to the inflator to actuate the air bag module and inflate the air bag.

Because the first and second electrical connectors are leadless, the first and second connectors can be operatively maintained in a stationary position relative to the inflator and the brushless transmitter, respectively, while the inflator and brushless transmitter are electrically connected to each other.

Other objects, features, and characteristics of the present invention will become apparent upon consideration of the following description in the appended claims with reference to the accompanying drawings, all of which form a part of the specification, and wherein like reference numerals designate corresponding parts in the various figures.

BRIEF DESCRIPTION OF THE DRAWINGS

The accompanying drawings illustrate the present invention. In such drawings:

FIG. 3 is a schematic sectional view showing an embodiment of the present invention taken along a line III—III of FIG. 1.

DETAILED DESCRIPTION OF THE PREFERRED EMBODIMENT

Figure 1:
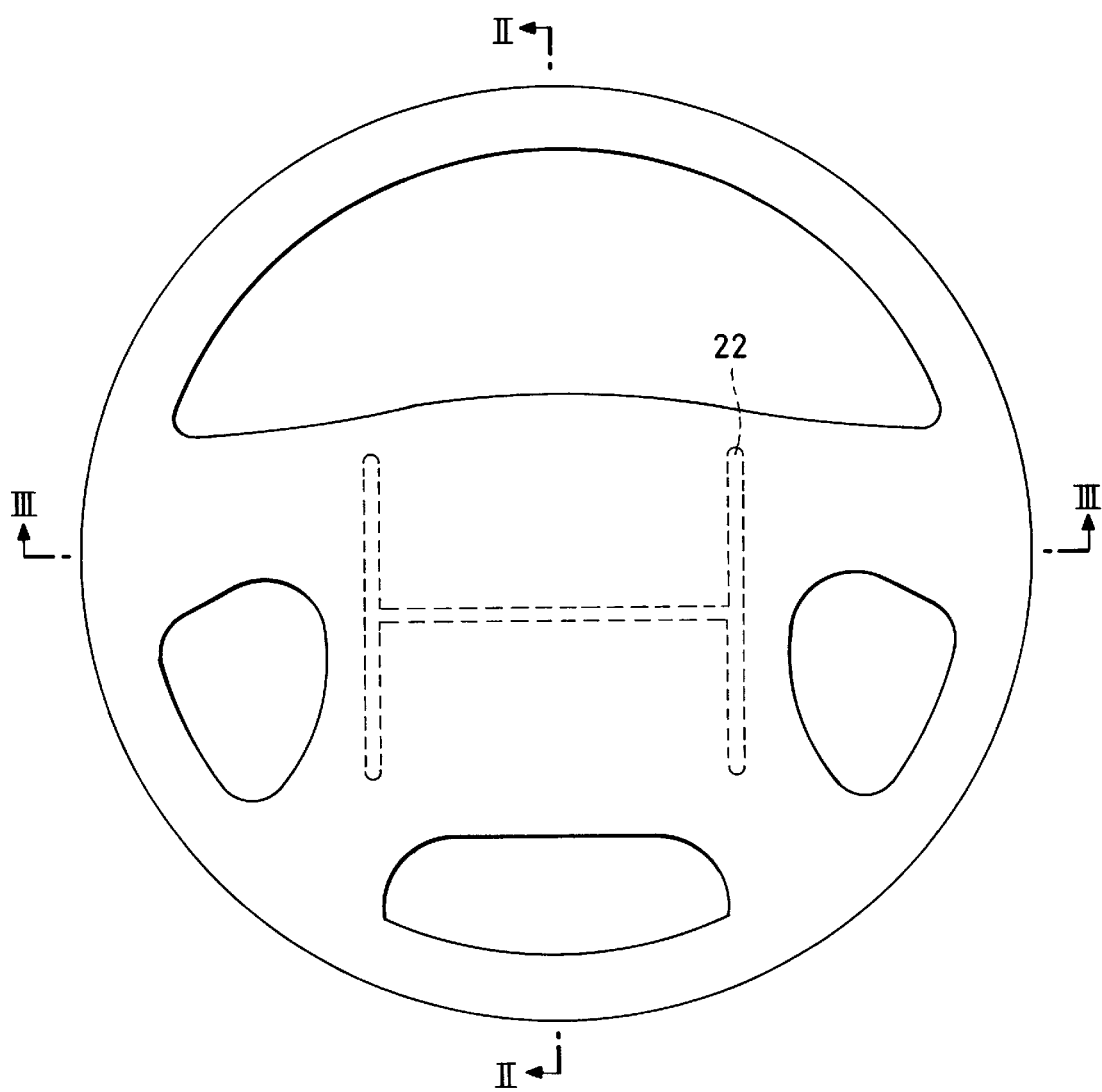
FIG. 1 is a general plan view of a steering wheel which can be adapted for application of the air bag apparatus of the present invention.

Description will now be made in detail of an air bag inflator actuating assembly according to a first embodiment of the present invention with reference to the drawings.

According to the first embodiment of the present invention, the air bag inflator actuating assembly is contained in a steering wheel assembly and includes an air bag apparatus (also referred to herein as an air bag module) 19 and a wheel pad (also referred to herein as a horn pad or pad) 21 arranged above the air bag apparatus 19. The air bag apparatus 19 is arranged above a core or boss plate 13 of a boss 11, which is generally disposed at a position that is substantially concentric to the longitudinal axis of the steering wheel assembly. The air bag apparatus 19 includes an expandable air bag 15 retained in a folded position and an inflator 17. The steering wheel assembly further includes a lower cover 20 assembled below the inflator 17. The inflator 17 is electrically connected to an external wiring connector 53, which is connected to the inflator 17 via a brushless transmitter 23.

As illustrated in a hashed line in FIG. 1, an inner surface of the pad 21 has a breakable H-shaped breaking groove 22. The pad 21 can be broken along the breaking groove 22 by inflation of the expandable air bag 15, thereby allowing the air bag 15 to be emitted from the steering wheel assembly and into its expanded (operative) position. An outer reinforcing insert 27 is embedded in a circumferential wall portion of the pad 21 to maintain the structural integrity of the pad 21. Integrally formed with the outer reinforcing insert 27 is an inner reinforcing insert 28, which is embedded in the top wall portion of the pad 21.

A membrane switch 24 is disposed immediately below the pad 21 and is mounted on an upper surface of a support plate 31. The support plate 31 is secured to the pad 21 by mounting legs 29 which project from the inner reinforcing insert 28 and extend through the back of the pad 21. The membrane switch 24 can be actuated by pressing an upper surface of the pad 21.

In the interests of brevity and simplification of the description of the first embodiment, the air bag apparatus 19 and a main body 33 of the steering wheel are herein collectively designated as a first subassembly of the air bag inflator actuating assembly, and the brushless transmitter 23 and the lower cover 20 are herein collectively designated as a second subassembly.

The specific construction of the first subassembly according to this embodiment is as follows.

Figure 2:
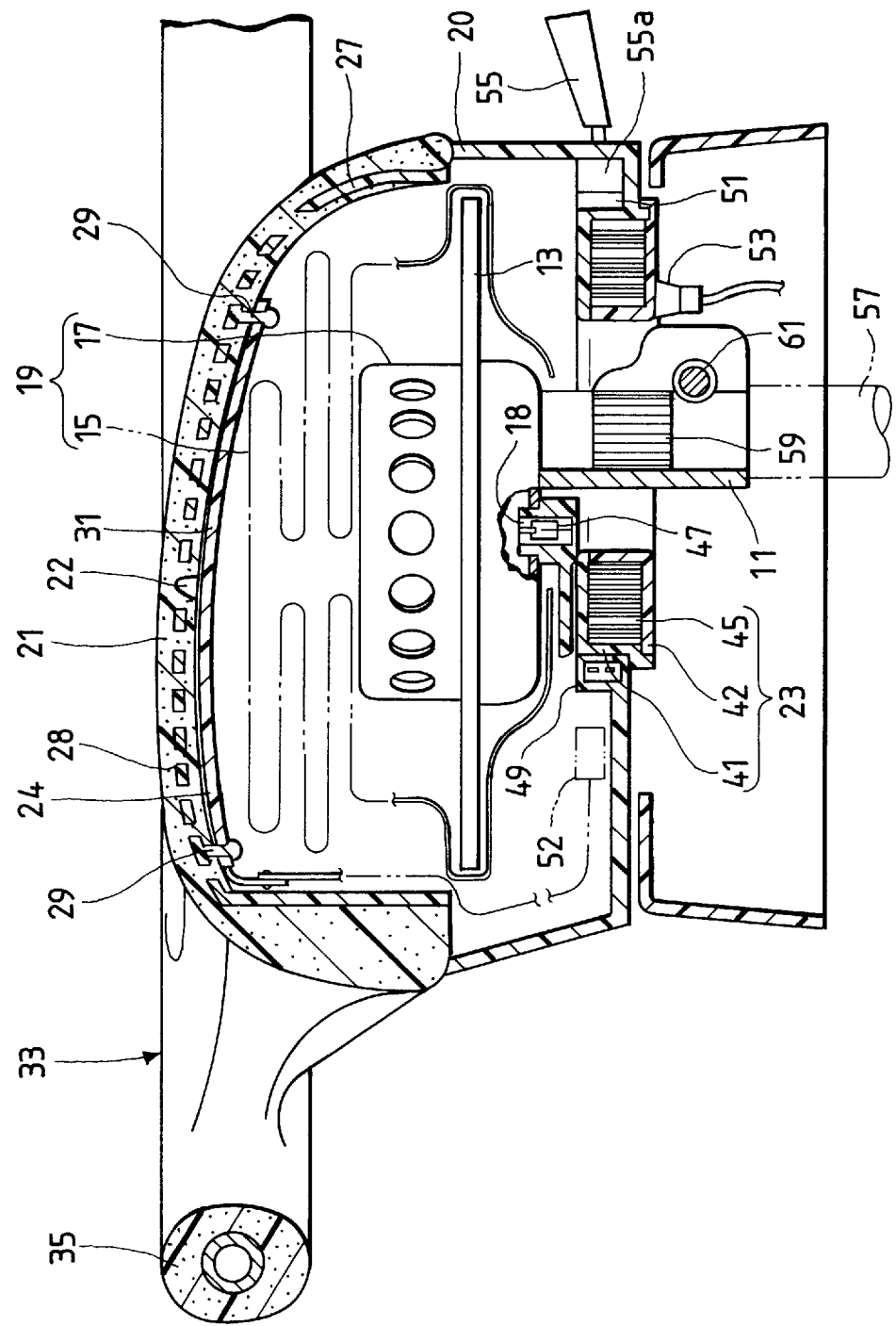
FIG. 2 is a schematic sectional view showing an embodiment of the present invention taken along a line II—II of FIG. 1.

As shown in FIGS. 2 and 3, the pad 21 is formed integrally with a core covering portion 34 of the main body 33. The boss 11 is integrally formed with the bottom portion of the inflator 17. Further, the boss plate 13 defines a flange extending around the inflator 17. As a result, the bottom portion of the inflator 17 and the boss plate 13 permit a simplified mounting of the inflator 17 during assembly.

The boss 11 and the bottom portion and flange of the inflator 17 (i.e., the boss plate 13) can be formed integrally by die-casting; alternatively, the boss 11 and inflator 17 can be formed separately and then secured by welding, through adhesives, or the like. Further, the boss 11 and the inflator 17 can be arranged concentrically; alternatively, as shown in FIGS. 2 and 3, the boss 11 and the inflator 17 can be arranged eccentrically so that the air bag apparatus may be positioned radially outwardly from the center of the steering wheel and, preferably, arranged at a position lower than the center of the steering wheel when the steering wheel is oriented as shown in FIG. 1 (that is, the steering wheel is oriented so as to allow the automobile to travel in a straight direction). By arranging the boss 11 and inflator 17 in this eccentric manner, visibility of the speedometer, odometer, and other gauges on the instrument panel are advantageously improved.

A spoke core bar 35 of the main body 33 is fastened to the boss plate 13 by fasteners such as, for example, screws or bolts 37. The bolts 37 each extend through one of a set of aligned mounting bolt holes (also referred to herein as spoke core bar fastening holes) 33a of the boss plate 13, mounting bolt holes 35a of the spoke core 35, and bolt holes (not shown) of the air bag 15. In this manner, the air bag 15 is mounted to the inflator 17, which in turn is mounted to the spoke core 35 and the boss plate 13 by the bolts 37. According to this specific construction, the air bag 15 and the inflator 17 can be assembled and mounted simultaneously with the mounting of the air bag apparatus 19 to the steering wheel main body 33.

The specific construction of the second subassembly is as follows.

The brushless transmitter 23 has a first housing 41 and a second housing 42 assembled to each other so as to be concentric with and rotatable relative to each other. The first and second housings 41 and 42 collectively define an annular chamber in which a flat cable 45 is spirally accommodated. One end of the flat cable 45 is fixed to the first housing 41 and the other end of the cable 45 is fixed to the second housing 42. The first housing 41 serves as a rotor and the second housing 42 serves as a stator. The brushless transmitter 23 can have a plurality of connectors connected to both the first housing 41 and the second housing 42, said connectors being adaptable to allow a plurality of sets of wires to be connected to the brushless transmitter 23. These connectors, such as a membrane switch connector 49, auto-drive switch connector 51, and controller connector 53, are described below.

As shown in FIG. 2, a first leadless connector (female connector) 18 is arranged on the lower surface of the inflator 17 and a second leadless connector (male connector) 47 is arranged on the upper surface of the first housing 41 of the brushless transmitter 23. The second connector 47 is received by the first connector 18. The connectors 18 and 47 thereby permit the direct electrical connection between the inflator 17 and the brushless transmitter 23. It is understood, however, that the first leadless connector 18 can be the male connector, and the second leadless connector 47 can be the female connector. Moreover, other inter-engaging types of connectors can be employed in accordance with the present invention to provide the direct electrical connection between inflator 17 and signal transmitter 23.

In addition, a membrane switch connector 49 and an auto-drive switch connector 51 are arranged at respective positions about the circumference of the first housing 41. The controller connector (external wiring connector) 53 is arranged on the lower surface of the second housing 42.

The first housing 41 of the brushless transmitter 23 can be formed integrally with the lower cover 20 in order to connect the brushless transmitter 23 and the lower cover 20; alternatively, the first housing 41 and lower cover 20 can be formed separately and thereafter integrated.

The second subassembly, having the brushless transmitter 23 integrally formed with the lower cover 20, then can be mounted to the main body 33 of the first subassembly to which the air bag apparatus 19 has been assembled. Simultaneously with or prior to mounting the first and second subassemblies, the membrane switch connector 49 and the auto-drive switch connector 51 are connected to a connector 52 arranged on an end of a lead from the membrane switch 24 and to a connector 55a of an auto-drive switch 55, respectively.

The lower surface of the inflator 17 and the upper surface of the brushless transmitter 23 are electrically connected to each other through the leadless connectors 18 and 47, which directly connect the lower surface of the inflator 17 to the upper surface of the brushless transmitter 23. No lead wires are required in order to achieve this direct connection. Because no lead wires are used, the first leadless connector 18 can be operatively maintained in a stationary position relative to the inflator 17 as the first leadless connector 18 is receiving the second leadless connector 47. Similarly, the second leadless connector 47 can be operatively maintained in a stationary position relative to the brushless transmitter 23 as the second leadless connector 47 is being received by the first leadless connector 18.

After the lower cover 20 has been fixed to the steering wheel main body 33, the pair of connectors 18 and 47 are directly mated, so as to permit the connectors 18 and 47 to vibrate integrally, so that the connectors are not likely to disengage when the automobile body vibrates or is subjected to an external force or impact, such as a collision.

The lower cover 20 is assembled to the main body 33 of the steering wheel by machine screws or the like (not shown).

The steering wheel assembly according to the above-described embodiment is attached to a steering shaft 57 by fitting the boss 11 into a serration 59 of the steering shaft 57 and securing the boss 11 with a bolt 61.

The air bag inflator actuating assembly of the present invention provides the following advantages as a result of the aforementioned construction.

Since the lower surface of the inflator is electrically connected to the upper surface of the brushless transmitter through a pair of leadless connectors, the pair of connectors vibrate integrally when the automobile body and the like are subjected to vibrations. As a result, the connectors between the inflator and the brushless transmitter are not likely to disengage during collisions or because of vibrations of the automobile body.

Therefore, the steering wheel with the air bag apparatus of the present invention needs no special provision for preventing the connectors from disengaging and disrupting the electrical connection between the inflator and the brushless transmitter.

An air bag inflator actuating assembly is disclosed in JP Hei 7-195326, filed on Jul. 31, 1995, the complete disclosure of which is incorporated herein by reference.

It is to be understood that the foregoing description and the accompanying drawings are not intended to limit the scope of this invention; rather, various modifications or variations may be made by those of ordinary skill in the art without departing from the scope of this invention which is defined by the appended claims. For example, the present invention also can be applied to a horn-switchless and boss-plate-separated type steering wheel assembly, in which the boss plate is not necessarily defined by the bottom portion and the flange of the inflator. Further, the present invention also can be applied to other air bag-containing assemblies.

What is claimed is:

1. An air bag inflator actuating assembly comprising:
   an air bag module including an expandable air bag retained in a folded position and an inflator containing a first leadless connector; and
   a transmitter containing a second leadless connector;
   wherein one of said first and second leadless connectors is receivable by the other leadless connector to provide a direct electrical connection between said inflator and said transmitter;
   wherein said first leadless connector is operatively maintained in a stationary position relative to said inflator, and wherein said second leadless connector is operatively maintained in a stationary position relative to said transmitter when said inflator is electrically connected to said transmitter.

2. An air bag inflator actuating assembly according to claim 1, wherein said first leadless connector is positioned on a lower surface of said inflator, and wherein said second leadless connector is positioned on an upper surface of said transmitter.

3. An air bag inflator actuating assembly according to claim 2, wherein said air bag inflator actuating assembly is contained in a steering wheel assembly.

4. An air bag inflator actuating assembly according to claim 3, further comprising an external wiring connector, said external wiring connector being electrically connected to said inflator by said transmitter.

5. An air bag inflator actuating assembly according to claim 3, wherein said first leadless connector is a male connector, and said second leadless connector is a female connector.

6. An air bag inflator actuating assembly according to claim 3, wherein said first leadless connector is a female connector, and said second leadless connector is a male connector.

7. An air bag inflator actuating assembly comprising:
   a boss;
   a boss plate connected to said boss;
   an air bag module connected to said boss plate, said air bag module including an expandable air bag retained in a folded position and an inflator containing a first leadless connector; and
   a transmitter containing a second leadless connector;
   wherein one of said first and second leadless connectors is receivable by the other leadless connector to provide a direct electrical connection between said inflator and said transmitter;
   wherein said first leadless connector is operatively maintained in a stationary position relative to said inflator, and wherein said second leadless connector is operatively maintained in a stationary position relative to said transmitter when said inflator is electrically connected to said transmitter.

8. An air bag inflator actuating assembly according to claim 7, wherein said first leadless connector is positioned on a lower surface of said inflator, and wherein said second leadless connector is positioned on an upper surface of said transmitter.

9. An air bag inflator actuating assembly according to claim 8, wherein said air bag inflator actuating assembly is contained in a steering wheel assembly.

10. An air bag inflator actuating assembly according to claim 9, further comprising an external wiring connector, said external wiring connector being electrically connected to said inflator by said transmitter.

11. An air bag inflator actuating assembly according to claim 9, wherein said first leadless connector is a male connector, and said second leadless connector is a female connector.

12. An air bag inflator actuating assembly according to claim 9, wherein said first leadless connector is a female connector, and said second leadless connector is a male connector.

13. An air bag inflator actuating assembly according to claim 9, further comprising:
    a wheel pad arranged immediately above said air bag module; and a steering wheel main body including a spoke core and a core covering portion which covers said spoke core, said spoke core being connected to said boss plate.

14. An air bag inflator actuating assembly according to claim 13, wherein said steering wheel main body is constructed in such a manner that said wheel pad is integrally formed with said core covering portion.

15. An air bag inflator actuating assembly according to claim 14, further comprising a lower cover assembled below said inflator.

16. An air bag inflator actuating assembly according to claim 15, wherein said transmitter includes a rotor and a stator and said rotor is integrally formed with said lower cover.

17. An air bag inflator actuating assembly according to claim 9, wherein said inflator has a flange and said boss plate defines a bottom portion and said flange of said inflator.

18. An air bag inflator actuating assembly according to claim 9, wherein said transmitter is a brushless transmitter.

* * * * *